United States Patent [19]
Boss et al.

[11] Patent Number: 5,746,090
[45] Date of Patent: May 5, 1998

[54] DRIVE APPARATUS FOR SLIDING ROOFS FOR AUTOMOBILES

[75] Inventors: Christoph Boss, Frankfurt; Hubert Bachmann, Dannstadt, both of Germany

[73] Assignee: Meritor Automotive GmbH, Germany

[21] Appl. No.: 704,403

[22] Filed: Aug. 20, 1996

[30] Foreign Application Priority Data

Aug. 26, 1995 [DE] Germany ............ 195 31 514.6

[51] Int. Cl.$^6$ ............ F16H 19/04; B60J 7/043; B60J 7/057
[52] U.S. Cl. ............ 74/89.17; 74/422; 74/502.6; 296/33
[58] Field of Search ............ 74/89.17, 422, 74/502.6; 296/223

[56] References Cited

U.S. PATENT DOCUMENTS

| | | | |
|---|---|---|---|
| 3,874,722 | 4/1975 | Pickles | 296/223 |
| 4,272,125 | 6/1981 | Bienert et al. | 296/223 |
| 4,919,005 | 4/1990 | Schleicher | 296/223 |
| 5,020,850 | 6/1991 | Bienert et al. | 296/223 |

FOREIGN PATENT DOCUMENTS

| | | |
|---|---|---|
| 1650918 | 2/1971 | Germany . |
| 2135803B2 | 8/1977 | Germany . |
| 787765 | 12/1957 | United Kingdom . |
| 1387140 | 3/1975 | United Kingdom . |
| 2068304 | 8/1981 | United Kingdom . |

Primary Examiner—Allan D. Herrmann

[57] ABSTRACT

A drive apparatus (5) is proposed, consisting of a drive casing (12) and a gear casing (19), in which the two casings (12, 19) are screwed to one another in a centered position and to the frame transverse component (2) with the incorporation between them of a plane wall of the front transverse frame portion (2) of a guide frame (1). The drive casing (12), preferably injection moulded in one piece from a wear-resistant, thermoplastics material, guides two drive cables (8, 9) with guide channels (15, 16) slender in the central portion (15) over such a length that the drive cables (8, 9) can emerge at both ends virtually free of lateral pressure from the drive casing (12) and enter the drive cable guides of the frame transverse portion (2). The drive casing (12) makes possible sliding movements of the drive cables guided with low radial clearance without noise caused by joint positions. As a result of the special formation of the drive casing (12) and of the gear casing (19) cooperating therewith, the drive apparatus can be mounted at low expense reliably and automatically centered, a drive pinion (20) situated in the drive casing (19) coming into engagement with the drive cables inside the drive casing (12).

5 Claims, 4 Drawing Sheets

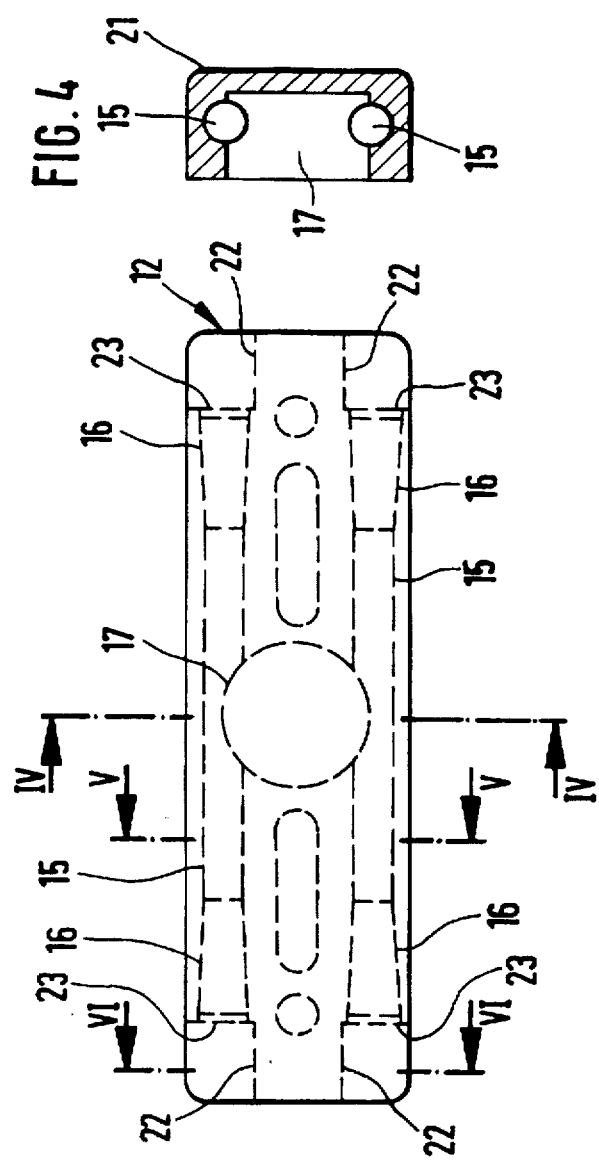

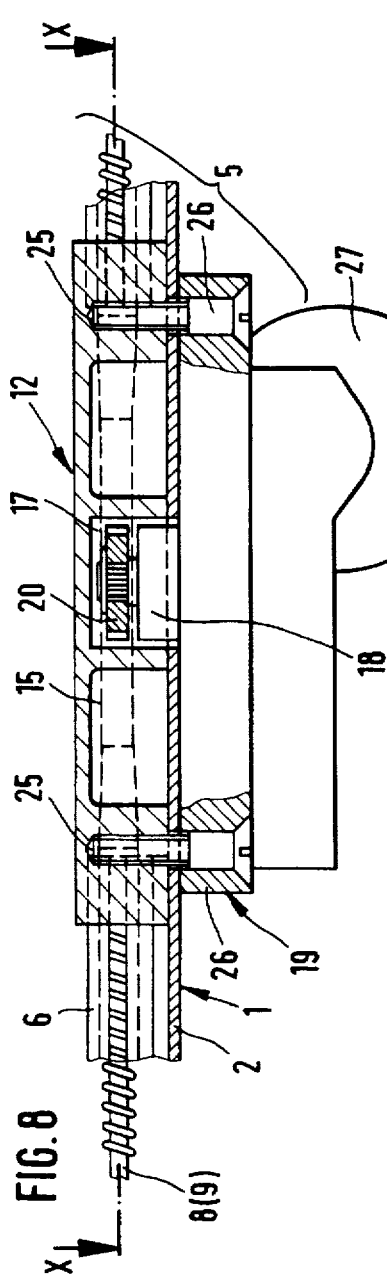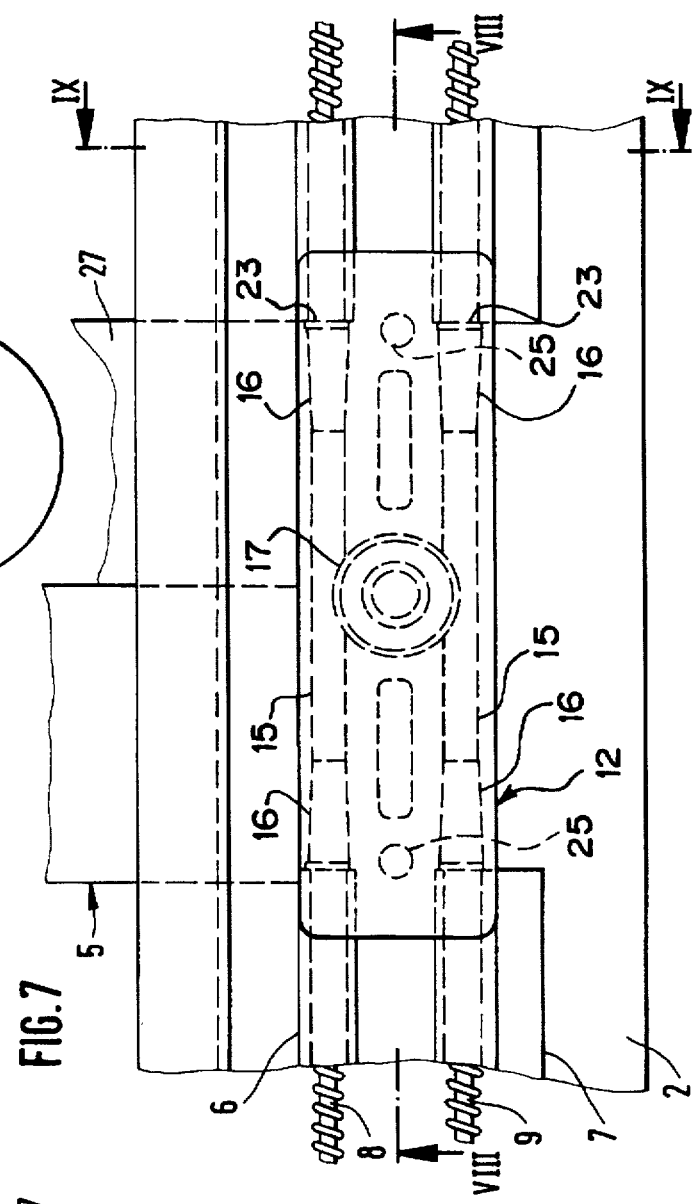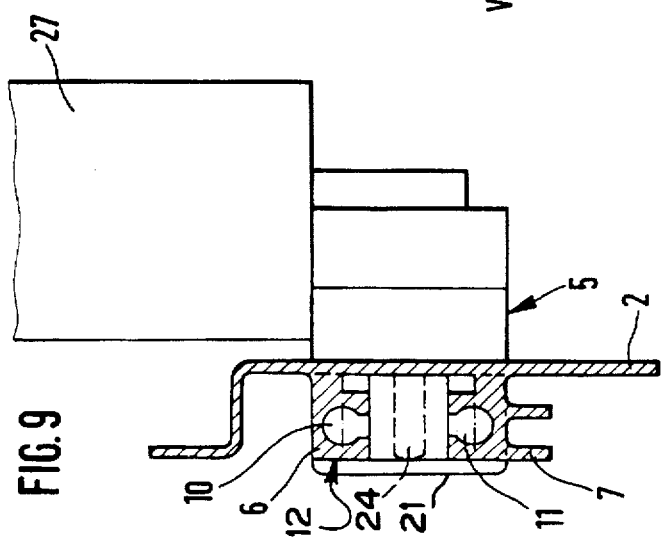

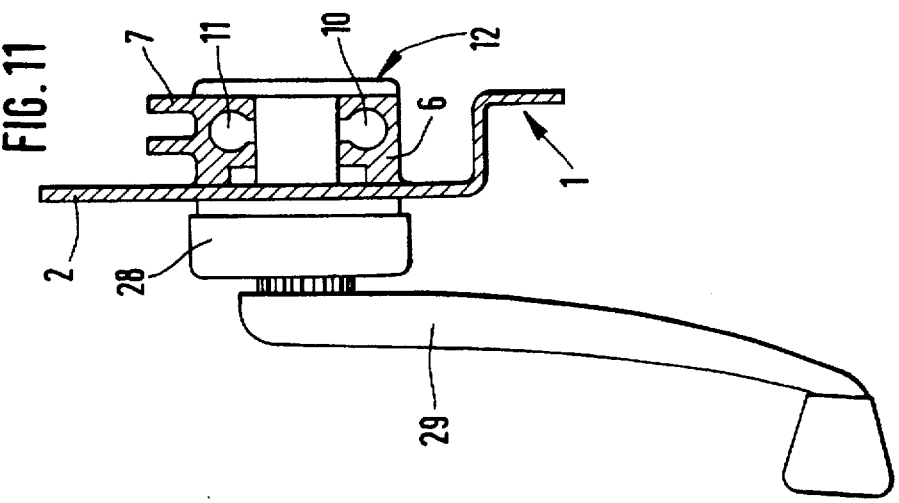
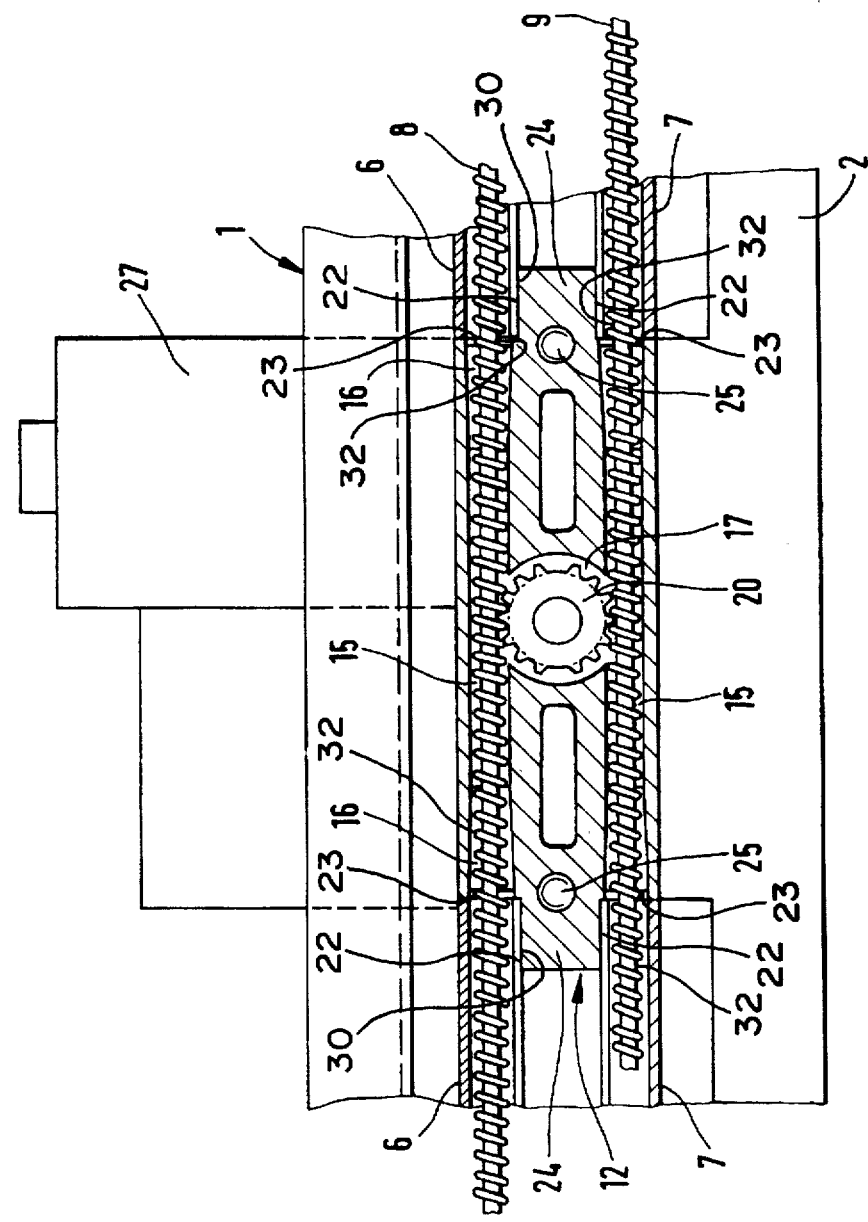

DRIVE APPARATUS FOR SLIDING ROOFS FOR AUTOMOBILES

FIELD OF THE INVENTION

This invention relates to a drive apparatus for sliding roofs for automobiles, more particularly, the invention relates to a drive apparatus having a drive pinion which engages on a helically wound drive cable guided in a guide channel.

BACKGROUND OF THE INVENTION

Driving apparatuses of this type are known in various forms (e.g. DE 12 06 740 C2, DE 38 03 816 A1, DE 38 09 949 A1). Common features of all these known drive apparatuses are that the guide channels in the region of the pinion engagement with the drive cables are constructed as flange walls of a guide component of metal sheet or spring steel bent to a U-shape, that their drive casing is constructed in two parts, and that the rotary bearings for the drive pinion and its drive shaft are mounted in the drive casing. Due to the rack-like engagement of the teeth of the drive pinion with the working coils of the otherwise flexible drive cable, these coils are pressed at the tooth engagement locations, outwardly until they bear against the sheet metal flange of the guide component. With a rotary drive of the drive pinion, therefore, undesirable noise develops, because the working turns must slide under applied pressure over design-imposed edges.

SUMMARY OF THE INVENTION

The objective of the present invention is to provide a drive apparatus of the initially named type, in which the drive noises can be at least considerably reduced in constructionally simple manner. A further object of the invention is to provide a drive apparatus of the type set forth above in which the guide channels each have a central hollow cylindrical portion which at least partly surrounds a said drive cable fitted closely in the portion, the portion being at least as long as the diameter of the drive pinion and wherein each portion opens out into drive cable guides, the drive pinion being mounted adjacent the centre of the portion for engagement with each drive cable.

By the special form of construction according to this invention of the guide channels in the drive casing, a very low-play guidance in the central portion of the guide channels of considerable length compared to the crown circle diameter of the drive pinion is achieved, which makes possible a chatter-free sliding of the drive cables, especially since the solution according to this invention dispenses with a sheet metal guide component bent to a U-curve, with the result that the drive apparatus is also considerably simplified and cheapened. Because the length of the central, hollow cylindrical portion of the guide channels, corresponds to at least twice the crown circle diameter of the drive pinion, the drive cables emerging from the drive apparatus enter in a centred position are virtually free of lateral pressure into the succeeding drive cable guides, with the result that even at these butt joints no operating noise can occur. The drive cables emerge well centred from the guide channels of the drive casing, optionally supported by a plastics flock applied between the turns of the working coil of the drive cables.

Preferably the drive guide channels are formed in a a drive casing either side of a central seating bore for the pinion oriented perpendicularly to the guide channels, this provides accommodation for the drive pinion in a simple manner. At opposite positions openings in the central, hollow cylindrical portions of the guide channels may be provided for the engagement of the drive pinion with the drive cables.

In one embodiment of the invention a division of the drive apparatus into a drive casing, accommodating and guiding the drive cables, and a gear casing accommodating a manual or electromotive drive and also the drive pinion is advantageous. Thus when installing the drive casing is seated from above on the guide frame, whereas the gear casing comes into bearing from below against the guide frame, the drive pinion entering the central seating bore of the drive casing in a defined manner through a corresponding aperture of the guide frame and the two casings being screwed to each other with centring and simultaneously being fixed on the guide frame in an accurately predetermined position.

With advantage, the guide frame may be constructed so that by the partial interruption of the drive cable guides situated on the guide frame, on the one hand a flat upper mounting surface for the drive casing is created on the guide frame and on the other hand the resultant end regions of the drive cable guides are able to be used as centring elements for the correspondingly shaped drive casing.

The centring of the drive casing with respect to the guide frame may be provided by the formation, of steps on the outer contour of the drive casing, which cooperate with the end regions of the drive cable guides created by the interruption.

Preferably the drive casing is simply injection moulded in one piece so as to simultaneously create all the bores, cavities and external contours including the two guide channels and the central seating bore for the drive pinion and requires no after-finishing. The use of a wear-resistant plastics material for injection moulding the drive casing makes possible also good sliding properties without notable additional lubrication between the drive casing and the drive cables. By the choice of a suitably wear-resistant plastics, premature wear of the drive casing is counteracted. In other respects, however, the drive casing can easily be replaced, without the other elements of the drive apparatus, such as the gear casing, needing to be replaced also.

Other features and advantages of the invention will become apparent upon considering the accompanying drawings, description and claims.

BRIEF DESCRIPTION OF DRAWINGS

FIG. 3 is a plan of the drive casing, FIGS. 4–6 are sections through the drive casing corresponding to the section line IV—IV, V—V and VI—VI in FIG. 3, FIG. 7 is a plan according to FIG. 2, but with the drive apparatus of the invention installed, FIG. 8 is a vertical section through the arrangement corresponding to line VIII—VIII in FIG. 7, FIG. 9 is a cross-section corresponding to line IX—IX in FIG. 7, FIG. 10 is a horizontal section through the arrangement corresponding to the line X—X in FIG. 8 and FIG. 11 is a cross-section similar to FIG. 9, but with a hand-operated drive apparatus.

DESCRIPTION OF THE PREFERRED EMBODIMENTS

Figure 1:
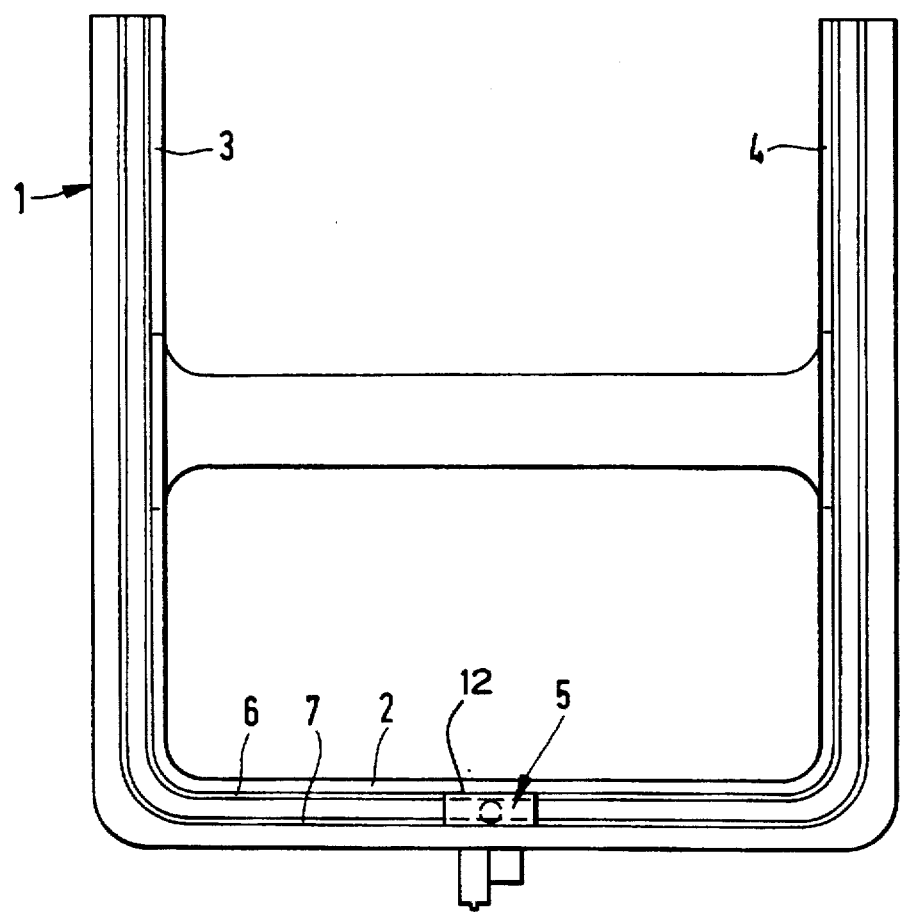
FIG. 1 is a plan of a guide frame for a sliding roof with drive apparatus according to the invention mounted thereto.

The guide frame 1, shown in FIG. 1, consists basically of a forward frame transverse part 2 and, adjoining it with rounded corners, lateral frame parts 3 and 4. In the centre of the frame transverse portion 2 the drive apparatus is mounted. In the example shown, a single-piece guide frame 1 is illustrated, which is bent at the corners from an initially rectilinear aluminium extruded profile. An integral part of the guide frame 1 are two drive cable guides 6 and 7, the cross-sections of which can be seen from FIGS. 9 and 11. The two drive cable guides run, in all the frame parts, parallel to one another and spaced at constant spacing. The drive cable guides 6 and 7 not only guide the drive cables 8 and 9, displaceable in a "thrust-stiff" manner therein, in corresponding channels 10 and 11, but also the other elements, not shown here, of the sliding roof construction. The designation sliding roofs is to be understood here as including all usual constructions, in which a lid associated with a roof opening is guided slidably and/or pivotally. As a departure from the form of construction shown in FIG. 1, the guide frame may also be manufactured from individual frame components and joined together.

Figure 2:
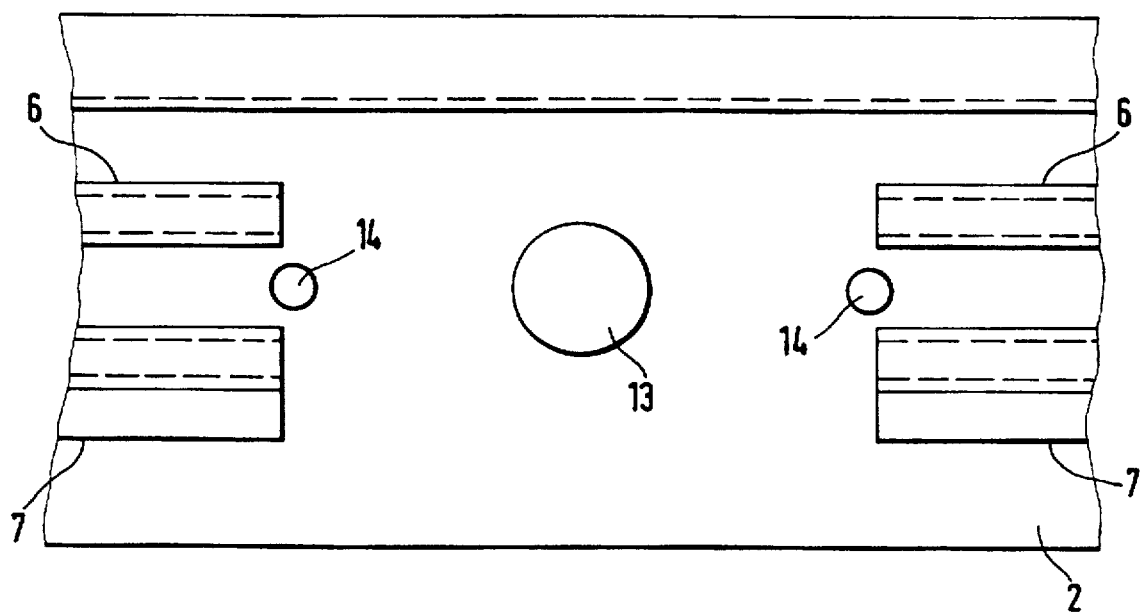
FIG. 2 is a partly cut-away plan of the central region of the forward transverse part of the guide frame of FIG. 1, prepared for the mounting of the drive apparatus.

As can be seen especially from FIG. 2, the drive cable guides 6 and 7 are interrupted, over an equal length, in the region provided for the installation of a drive casing 12, shown in FIGS. 3 to 6 as an individual component, for example by milling-cutting through the drive cable guides 6 and 7 in this region. This creates, in the central region of frame transverse component 2, and upwardly facing, plane installation platform for the drive casing 12, in which a central passage opening 13 and two lateral fixing bores 14 are situated. For a description of the drive casing 12, accurately adapted to the interrupted length of the drive cable guides 6 and 7, reference is now made to FIGS. 3 to 6.

The drive casing 12, for example injection moulded from polyamide 66, is of elongate and approximately rectangular form. In it there are two parallel, spaced-apart guide channels, the mutual spacing of which accurately corresponds to the spacing between the channels 10 and 11 in the drive cable guides 6 and 7. The two guide channels in the guide casing 12 each have a central, hollow cylindrical portion 15 and, at either side, hollow, truncated conical shape end portions 16 of equal shapes. The diameter of the central hollow cylindrical portions 15 is so designed that in these portions the drive cables 8 and 9 and, respectively, their helical working turns are closely surrounded by the wall faces of the hollow cylindrical portions with small radial clearance. The drive cables 8 and 9 should, however, be displaceable easily in the axial direction inside the portions 15. The hollow truncated conical end portions 16 are so dimensioned that their smallest diameter is equal to the diameter of the central hollow cylindrical portions 15, whereas their larger diameter is at least as large as the diameter of the channels 10 in the drive cable guides 6 and 7 adjoining them at either side.

The drive casing 12 is provided with a central seating bore 17 for a drive pinion 20 (FIG. 8), journalled to be drivable rotatably in either direction overhung on a cylindrical projection 18 of a gear casing 19. The seating bore 17 is constructed as a blind bore and is orientated perpendicularly to the guide channels 15, 16. The diameter of the seating bore 17 corresponds approximately to the spacing between the centre lines of the guide channels 15, 16. The diameter of the through opening 13 in the transverse frame portion 2 is equal to the diameter of the seating bore 17, so that the drive pinion 20 can be introduced from below with sufficient radial clearance through the through opening 13 into the seating bore 17. The seating bore 17 passes through the central portions 15 of the guide channels, as can be seen particularly clearly in FIG. 4, and thereby freely exposes the portions 15 in the region of the engagement between the drive cables 8 and 9 with the drive pinion 20. During installation, therefore, the drive pinion 20 comes into toothed engagement with the helical-shaped working turns of the two drive cables 8 and 9. Rotations of the drive pinion 20 cause displacement movements of the drive cables in mutually opposite directions.

In the example shown, the two central hollow cylindrical portions 15 of the guide channels are approximately three times as long as the crown circle diameter of the drive pinion 20. This guide length causes the drive cables 8 and 9 to enter into the adjoining channels 10 and 11 of the drive cable guides 6 and 7 as they emerge from the drive casing 12, virtually without lateral pressure.

The drive casing 12 is centred as follows with respect to the drive cable guides 6 and 7 on the frame transverse member 2. At the two ends of the drive casing 12 there are step-shaped recesses of the peripheral contour of the drive casing 12, which are symmetrically disposed both with regard to the transverse central axis and also with regard to the longitudinal central axis of the drive casing 12. The step-shaped recesses are, however, not continued over the full height of the drive casing 12 but terminate starting from the mounting surface of the drive casing 12 i.e. from its lower face, before they reach the upper cover surface 21 of the drive casing. Each of the four step-shaped recesses is formed of a lateral centring surface 22, associated with the adjacent drive cable guide, and of a step surface 23, associated with the end face of the adjacent drive cable guide. In this way there are created, at the two ends of the drive casing 12, centring projections 24, which accurately fit into the centering receptacles 30 between the drive cable guides 6 and 7, as FIG. 10 illustrates. The distance between the step surfaces 23 on each side of the longitudinal axis of the drive casing 12 is so constructed that, during installation, the interruption points of the two drive cable guides 6 and 7 are bridged across axially free of play. In this way, a secure centring of the drive casing 12, automatically occurring on assembly, is achieved with respect to the drive cable guides 6 and 7 on either side and the channels 10 and 11 contained therein. The drive cables 8, 9 are enclosed within the channels 10, 11 and have exposed portions 32 emerging from the cable guides 6, 7.

On both sides of the seating bore 17 there are threaded bores 25 in the drive casing 12, the spacing a part of which corresponds to the spacing of the fixing bores 14 in the frame transverse member 2. Corresponding setting bores are provided also in the gear casing 19, through which fitted screws 26 are introduced from below, which engage with the threaded bores 25 after assembly. By the setting bores and fitted screws, the centring of the gear casing 19 with respect to the drive casing 12 is assured, both these casings, namely the drive casing 12 and gear casing 19, being simultaneously fixed to the transverse frame component 2, as FIG. 8 shows.

In FIGS. 1 and 7 to 10, an electric motor drive is illustrated, in which a gear motor 27 is combined with the gear casing 19.

In the example of embodiment according to FIG. 11, the gear casing 19 is replaced by a drive plate 28, which is screwed into the drive casing 12 in the manner described in relation to FIG. 8. The drive here is by hand, through operating crank 29.

A drive apparatus 5, consisting of a drive casing 12 and a gear casing 19, is proposed, in which the two casings 12, 19 are screwed in a centred position to one another and to the frame transverse member 2, with the interposition between them of a plane wall of the front frame transverse member 2 of a guide frame 1. The drive casing 12, preferably injection moulded in one piece from a wear-resistant, thermoplastics material, guides two drive cables 8, 9 with guide channels 15, 16, slender in the central portion 15, over such a length that the drive cables 8, 9 can emerge at both ends virtually free of lateral pressure from the drive casing 12 and enter the drive cable guides of the frame transverse member 2, also without lateral pressure. The drive casing 12 enables the drive cables to slide whilst, guided with low radial clearance, without noise created by butt joints. As a result of the special formation of the drive casing 12 and of the gear casing 19 cooperating therewith, the drive apparatus can be mounted with low installation cost reliably and automatically centred, a drive pinion 20, situated on the gear casing 19, coming into toothed engagement with the drive cables inside the drive casing 12.

Various features of the invention are set forth in the following claims.

We claim:

1. A drive apparatus for driving a pair of flexible drive cables of an automobile sliding roof, comprising:

a drive casing, said casing including a pair of mutually parallel spaced-apart channels having a determined spacing width between them, said channels adapted to receive said cables slidingly therein, each said channel having a central hollow portion dimensioned to closely surround said cables, each said channel further having first and second flared ends at which are provided cable guides aligned axially with said channels, wherein said cables are enclosed within said channels and wherein each of said cables have exposed portions emerging from said cable guides; and a drive pinion rotatably mounted to said casing between said channels, said drive pinion connected to said cables for slidingly driving said cables within said channels.

2. A drive apparatus according to claim 1 wherein said casing further includes a central seating bore for said drive pinion having an axis orientated perpendicularly to said guide channels and wherein said drive pinion has a diameter which essential corresponds to said spacing width of said channels.

3. A drive apparatus according to claim 1 wherein said drive casing further includes a guide frame interposed between said spaced-apart channels and wherein said exposed cable portions lie within said guide frame, and wherein said drive pinion is mounted projectingly to a gear casing, said gear casing adapted to be mounted via screws to the drive casing with said guide frame interposed between said drive casing and said gear casing and housing said exposed cable portions therein said guide frame wherein mounting said gear casing to said drive casing and interposing said guide frame simultaneously provides for centering of the drive pinion with respect to said drive cables and with respect to said channels.

4. A drive apparatus according to claim 3, wherein said guide frame includes guide frame cable guides for receiving said exposed cable portions, and wherein said guide frame is inserted form-fittingly via centering projections found on said drive casing into centering receptacles located between said drive casing cable guides, whereby said guide frame cable guides bridge, without axial play, said drive casing.

5. A drive apparatus according to claim 1 wherein said drive casing is injection molded in one piece from a thermoplastic, wear-resistant material.

* * * * *